March 6, 1951
R. H. GODDARD
2,544,423
LIQUID-SEALING MEANS BETWEEN
STATIONARY AND ROTATED PARTS
Filed May 15, 1948
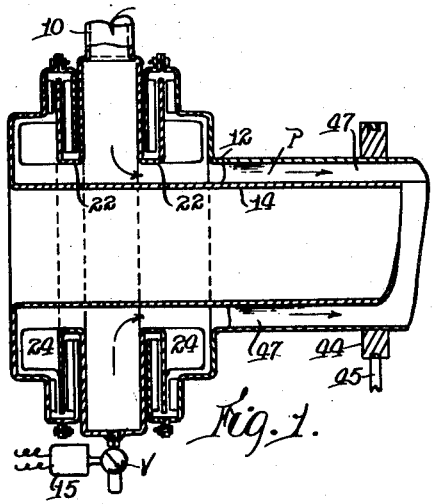
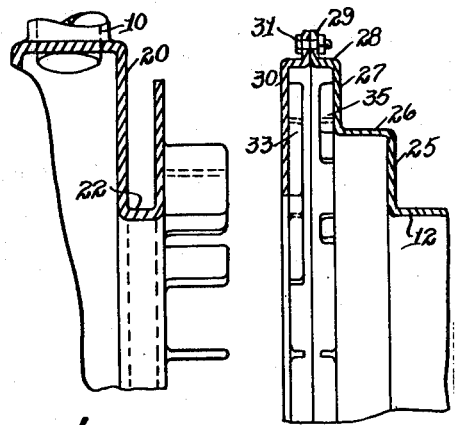
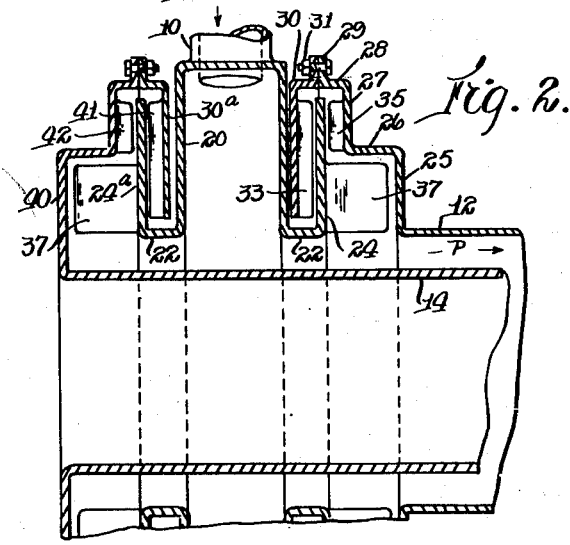
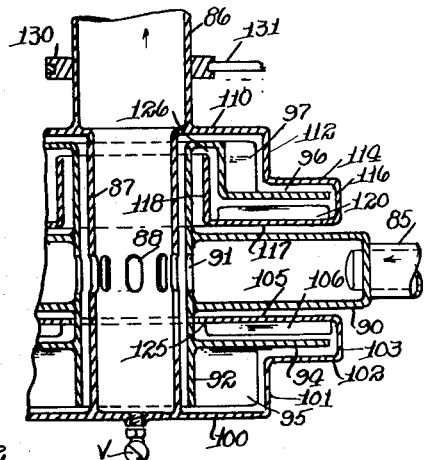
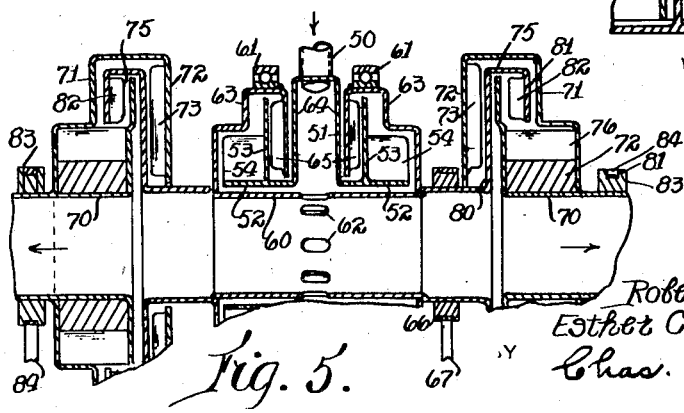
INVENTOR.
Robert H. Goddard, Dec'd.
Esther C. Goddard, Executrix.
BY Chas. T. Hawley
ATTORNEYS.

Patented Mar. 6, 1951

2,544,423

UNITED STATES PATENT OFFICE 2,544,423

LIQUID-SEALING MEANS BETWEEN STATIONARY AND ROTATED PARTS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application May 15, 1948, Serial No. 27,285

11 Claims. (Cl. 285—109)

This invention relates to sealing means for preventing leakage between stationary and rotated parts.

It is the general object of this invention to provide means in which a suitable heavy liquid, such as mercury, may be used to prevent leakage of a second liquid being transferred to a rotated part, such as a hollow shaft or tube, from a stationary part to which the second liquid is supplied under pressure.

A further object is to provide a liquid-sealing means in which a minimum amount of the sealing liquid will be required for effective operation, and in which the sealing liquid will be retained without loss when the rotated part is brought to rest.

The invention further relates to arrangements and combinations of parts which will be hereinafter described and more particularly pointed out in the appended claims.

Preferred forms of the invention are shown in the drawings, in which

Fig. 1 is a sectional side elevation of a preferred form of this invention;

Fig. 2 is an enlarged sectional view of certain parts shown in Fig. 1;

Fig. 3 is an enlarged detail view of a portion of the stationary part;

Fig. 4 is a similar view of a portion of a rotated part;

Fig. 5 is a sectional side elevation of a modified construction; and

Fig. 6 is a sectional side elevation of a further modification.

Referring to Figs. 1 to 4, the invention is shown as providing sealing means by which a selected liquid, as gasoline, may be transferred without leakage from a stationary pipe 10 to an annular passage P between rotated tubular members 12 and 14.

The pipe 10 (Fig. 3) is connected into a flat stationary cylindrical casing 20 having a valve V at its lowest point for draining the casing after operations are discontinued. The valve V may be operated by a magnet or solenoid 15, which may be remotely controlled. The casing 20 has a short cylindrical portion 22 at each side, connecting the side wall of the casing 20 to outwardly-extending flat flanges 24 and 24a.

The pipe 12 supports a rotating structure comprising a flange 25 (Fig. 3), a cylindrical portion 26, a second flange 27, and an outer cylindrical portion 28 having a clamping flange 29. A second flange member 30 is secured to the clamping flange 29 by bolts 31 and extends inward adjacent the side wall of the casing 20.

The rotating flange member 30 is provided with a plurality of radiating vanes 33 having relatively close clearance with the inner face of the adjacent flange 24 of the stationary casing 20. The rotating flange portion 27 also has a plurality of vanes 35 rotating adjacent the outer face of the flange 24. The vanes 35 are relatively short. The flange 24 has a plurality of short but wide stationary vanes 37 on its outer face.

The inner tubular member 14 is flanged outward at 40 and is provided with long radiating vanes 41 and short radiating vanes 42, corresponding to the vanes 33 and 35 previously described. The stationary flange 24a has a set of stationary vanes 37.

The tubular member 12 may be provided with a pulley 44 rotated by a belt 45, or any other convenient rotating means may be provided. The tubular members 12 and 14 may be connected by radiating partitions 47 which hold these parts concentric and insure simultaneous rotation thereof.

The operation of the above-described liquid-sealing means is as follows: A limited amount of a heavy liquid, such as mercury, is placed in the lower part of the casing 20 and adjacent parts and may fill these parts to about one-third of their total depth, assuming that the device operates in a horizontal position.

When the parts are at rest, the spaces between the stationary vanes 24 in the lower part of the device provide considerable extra storage. Before the second liquid to be transferred is supplied through the pipe 10, the tubular members 12 and 14 are placed in rotation. The mercury is thus moved outward by the centrifugal force developed largely by engagement of the mercury with the rotating vanes 33, 35, 41 and 42. The mercury thus effectively seals the passages around the outer edges of the stationary flanges 24 and 24a. The liquid to be transferred may then be admitted under pressure to the pipe 10 and will be delivered to the annular passage P.

The inner vanes 33 and 41, being substantially longer than the outer vanes 35 and 42, exert a greater centrifugal force and prevent passage of the mercury around the inner edges of the rotating flange members 30 and 30a.

The difference in centrifugal force between the long vanes, as 33, and the short vanes, as 35, is commonly sufficient to offset the pressure of the liquid supplied through the pipe 10, but in case the liquid is supplied under relatively heavy pressure, the vanes 35 may be omitted, so that the entire centrifugal force produced by the vanes 33 will be exerted against the liquid under such heavy pressure.

Very simple and effective sealing means is thus provided between the stationary supply pipe 10 and casing 20, and the passage P between the rotated tubular members 12 and 14. Furthermore, it will be noted that the only friction developed in the sealing means is friction between solids and liquids, and that in no case do solid rotating parts have contact with solid stationary parts.

In the construction shown in Fig. 5, provision is made for sealing the connection between a stationary supply part and a rapidly rotated pipe or tube extending through and in both directions from the stationary part.

In this construction, the sealing of the rapidly rotating pipe is accomplished in two stages, and the liquid to be transferred may be supplied at correspondingly higher pressures. The liquid to be transferred is supplied through a pipe 50 to a flat cylindrical casing 51 having cylindrical or sleeve-like extensions 52 provided with outwardly extending stationary flanges 53 which each support a plurality of relatively wide stationary vanes 54.

A tubular member 60 is supported in bearings 61 and rotates within the cylindrical portions 52 of the stationary part. Port openings 62 permit liquid to pass from the flat cylindrical casing 51 to the interior of the tubular member 60.

The member 60 has enclosing casing members 63 which support inwardly-extending flanges 64 provided with radiating vanes 65. A pulley 66 and belt 67, or any other convenient means, may be provided for rotating the member 60 at a desired speed.

Tubular members 70 are aligned with the members 60. Each tubular member 70 has a casing 71 supporting an inwardly-extending flange 72 provided with radiating vanes 73. Each member 70 also has an inner flange 75, and short but wide radiating vanes 76 are provided between the casing 71 and the flanges 75. The vanes 76 are spaced from the tubular member 70 by solid rings or fillers 77.

The tubular member 60 previously described has end flanges 80 extending around the end flanges 75 of the tubular members 70, and these end flanges 80 are provided with inwardly-extending flanges 81 having short radiating vanes 82.

The operation of this form of the invention is as follows:

When liquid under pressure is supplied through the pipe 50 to the stationary casing 51, the sealing liquid, as mercury, will be forced radially outward in the rotating flanged casing portions 63 which enclose the stationary flanges 53. This mercury will be prevented from flowing inward and around the inner edges of the rotating flanges 64 by the centrifugal action of the vanes 65. Communication is thus established between the stationary supply pipe 50 and the rotating tubular member 60 through the ports 62 and leakage between these parts is effectively prevented.

The liquid delivered to the tubular member or sleeve 60 is discharged from the opposite ends of said sleeve into the tubular members 70, which are designed for rotation at somewhat higher speeds than the member 60 and which may be rotated by pulleys 83 and belts 84 or in any other convenient manner.

The speeds of rotation of the two members 70 may or may not be the same, provided they are both in excess of the speed of rotation of the member 60. So long as this speed relation exists, the centrifugal effect of the vanes 73 will overcome the centrifugal effect of the shorter and more slowly rotating vanes 82 and will prevent any escape of liquid around the inner edges of the annular flanges 72.

Effective sealing between the stationary supply pipe 50 and rapidly rotating tubular members 70 is thus effected by a two-stage sealing operation.

An adaptation of the invention to operation in a vertical position is shown in Fig. 6, in which a liquid to be transported is supplied under pressure through a pipe 85 and is delivered through a rotating tubular member 86 having a reduced lower cylindrical extension 87 provided with a plurality of admission ports 88.

The stationary pipe 85 is mounted on a flat cylindrical casing 90 having ports 91 formed in a cylindrical sleeve portion 92 thereof, which loosely surrounds the tubular extension 87.

The sleeve 92 has a flat outwardly-extending lower annular flange 94 provided with a series of relatively wide stationary vanes 95. The sleeve 92 is also provided with an upper offset and outwardly-extending flange member 96 having vanes 97 of relatively less area than the vanes 95.

The tubular extension 87 has a lower end flange or disc 100 having successive flanged portions 101, 102 and 103. The short cylindrical portion 103 supports an inwardly-extending flat annular disc 105 provided with spaced radial vanes 106, the outer edges of which are adjacent to the upper face of the stationary disc 94.

The tubular member 86 is provided at its lower end with an annular disc or plate 110 which supports the tubular extension 87 at its inner edge. At its outer edge, the disc 110 has successive flanged portions 112, 114 and 116, and the short cylindrical portion 116 supports an inwardly-extending annular flange 117 having an upwardly-extending inner sleeve 118.

The flange 117 is also provided with a plurality of spaced radial vanes 120, rotating adjacent the lower face of the fixed flange 96. A valve V is provided for draining the tubular member 86—87 when operations are discontinued.

At such times the sealing liquid, as mercury, collects in the lower end of the rotating structure below the stationary flange 94 and between the stationary vanes 95. An additional portion of the mercury collects in the upper part of the sealing device in the space outside of the sleeve 118.

When the device is in operation, the pressure on the liquid supplied through the pipe 85 causes said liquid to be discharged through the tubular member 86, and the same pressure forces the mercury into the casing spaces in which the vanes 106 and 120 are revolving.

The liquid is supplied to these spaces at the peripheries thereof and the tendency of the liquid to flow toward the axis and to escape at the points 125 and 126 is offset by the centrifugal action of the mercury as accelerated by the vanes 106 and 120.

Satisfactory provision is thus made for delivering a liquid under pressure from a stationary supply, as 85, to a rapidly-rotating tubular member, as 86, and with the rotating member vertically positioned. Any suitable provision may be made for rotating the member 86, as by a pulley 130 and belt 131.

Having thus described three forms of the invention and the advantages thereof, it will be understood that the invention is not to be limited to the details herein disclosed, otherwise than as set forth in the claims, but what is claimed is:

1. Liquid-sealing means between stationary and rotated parts comprising a stationary supply casing having short cylindrical axial extensions and outwardly-extending annular flanges mounted on said extensions and in radial planes perpendicular to the axis of said casing, a rotated delivery member having a rotated annular casing member positioned outside of each stationary annular flange and having a rotated annular flange positioned between said supply casing and each stationary flange and in a radial plane perpendicular to the axis of said member, means to connect the outer edges of the rotated casing members and the associated rotated annular flanges, and a series of vanes on said annular flanges rotating adjacent each stationary flange, whereby leakage is prevented by centrifugal force.

2. The combination in liquid-sealing means as set forth in claim 1, in which a second series of vanes is provided on each rotated annular casing member to rotate adjacent the outer portion only of the second face of each stationary flange.

3. The combination in liquid-sealing means as set forth in claim 1, in which one annular casing member is mounted on an outer rotated tube and in which the second annular casing member is mounted on an inner and concentric tube, and in which the liquid is delivered through the annular passage between said tubes.

4. The combination in liquid-sealing means as set forth in claim 1, in which the annular portion of each rotating annular casing is axially offset and in which wide vanes on each stationary annular flange are positioned in said offset portions.

5. The combination in liquid-sealing means as set forth in claim 1, in which the delivery member rotates about a vertical axis and has an annular series of entrance ports, and in which the upper stationary annular flange has an inner cylindrical upward extension for increased storage when the parts are at rest.

6. The combination in liquid-sealing means as set forth in claim 1, in which the delivery member rotates about a vertical axis and has an annular series of entrance ports, and in which the cylindrical axial portion of the stationary supply casing has a corresponding series of supply ports adjacent said entrance ports.

7. The combination in liquid-sealing means as set forth in claim 1, in which the delivery member rotates about a vertical axis and has an annular series of entrance ports, and in which the cylindrical axial portion of the stationary supply casing has a corresponding series of supply ports adjacent said entrance ports, and in which said stationary cylindrical axial portion is downwardly extended and supports a plurality of stationary vanes in a storage space adjacent thereto.

8. The combination in liquid-sealing means as set forth in claim 1, in which the rotated delivery member comprises a tube extending freely through said stationary supply casing and having ports providing communication between said casing and the interior of said tube.

9. The combination in liquid-sealing means as set forth in claim 8, in which a second rotated delivery tube is mounted in axial alignment with said first tube, and in which additional sealing means is provided between said first and second rotated delivery tubes.

10. Sealing-means between rotated aligned tubes comprising an annular flange member on one tube having a peripheral cylindrical portion and having a second and inwardly-extending flange mounted on said portion, an annular casing member on said second tube having a peripheral cylindrical portion and having an inwardly-extending flange mounted on said peripheral portion, the structure on said second tube enclosing the structure on said first tube, said second tube having also an annular flange positioned between the annular flange member and the inwardly-extending flange on the first tube, and a series of vanes on each annular flange of said first and second tubes, each series being positioned adjacent an annular flange surface associated with the preceding tube.

11. Liquid-sealing means between stationary and rotated parts comprising a stationary supply member, a first rotated delivery member, centrifugal sealing structure between said supply member and said first delivery member, a second rotated delivery member aligned with said first delivery member, and centrifugal sealing means between said first and second rotated delivery members.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 725,937 | Craig | Apr. 21, 1903 |